United States Patent
Wang et al.

(10) Patent No.: US 10,125,229 B2
(45) Date of Patent: *Nov. 13, 2018

(54) CONTINUOUS MANUFACTURING PROCESS FOR RUBBER MASTERBATCH AND RUBBER MASTERBATCH PREPARED THEREFROM

(71) Applicant: EVE RUBBER INSTITUTE CO., LTD., Qingdao, Shandong (CN)

(72) Inventors: Mengjiao Wang, Bedford, MA (US); Jianjun Song, Shandong (CN); Deying Dai, Shandong (CN)

(73) Assignee: EVE RUBBER INSTITUTE CO., LTC, Shandong (CN)

( * ) Notice: Subject to any disclaimer, the term of this patent is extended or adjusted under 35 U.S.C. 154(b) by 160 days.

This patent is subject to a terminal disclaimer.

(21) Appl. No.: 14/910,221

(22) PCT Filed: Jul. 22, 2014

(86) PCT No.: PCT/CN2014/082712
§ 371 (c)(1),
(2) Date: Feb. 4, 2016

(87) PCT Pub. No.: WO2015/018280
PCT Pub. Date: Feb. 12, 2015

(65) Prior Publication Data
US 2016/0185921 A1    Jun. 30, 2016

(30) Foreign Application Priority Data

Aug. 5, 2013 (CN) .......................... 2013 1 0337779

(51) Int. Cl.
| C08J 3/22 | (2006.01) |
| B29B 7/30 | (2006.01) |
| B29B 7/58 | (2006.01) |
| B29B 7/90 | (2006.01) |
| B29C 47/40 | (2006.01) |
| C08J 3/12 | (2006.01) |
| C08J 3/21 | (2006.01) |
| B29B 7/74 | (2006.01) |

(52) U.S. Cl.
CPC .................. *C08J 3/22* (2013.01); *B29B 7/30* (2013.01); *B29B 7/58* (2013.01); *B29B 7/7495* (2013.01); *B29B 7/90* (2013.01); *B29C 47/40* (2013.01); *C08J 3/12* (2013.01); *C08J 3/122* (2013.01); *C08J 3/212* (2013.01); *C08J 2309/00* (2013.01)

(58) Field of Classification Search
CPC .... C08K 3/04; C08K 3/22; C08J 3/226; C08J 2309/00; C08J 3/22
See application file for complete search history.

(56) References Cited

U.S. PATENT DOCUMENTS

| 3,663,666 | A | 5/1972 | Vincent |
| 3,920,604 | A | 11/1975 | Berg et al. |
| 6,025,415 | A | 2/2000 | Scholl |
| 6,048,923 | A | 4/2000 | Mabry et al. |
| 9,758,627 | B2 * | 9/2017 | Wang ........................ B29B 7/30 |
| 2005/0222317 | A1 | 10/2005 | Yatsuyanagi et al. |
| 2010/0041549 | A1 * | 2/2010 | Weismantel ........... C08F 220/06 502/402 |
| 2012/0108732 | A1 * | 5/2012 | Nakayama ................ B60C 1/00 524/508 |
| 2015/0166427 | A1 * | 6/2015 | Luebke ................... C10G 11/18 585/329 |
| 2016/0168341 | A1 * | 6/2016 | Wang ........................ B29B 7/30 523/351 |

FOREIGN PATENT DOCUMENTS

| CN | 101463149 | 6/2009 |
| CN | 102414270 | 4/2012 |
| CN | 103113597 | 5/2013 |
| CN | 103159990 | 6/2013 |
| CN | 103203810 | 7/2013 |
| CN | 103419293 | 12/2013 |
| JP | 2012214566 | 11/2012 |
| WO | WO201366329 | 5/2013 |

OTHER PUBLICATIONS

Full English Translation of CN 103113597 (May 22, 2013) (Year: 2013).*
Chinese Office Action cited in CN201310337779.1 dated Feb. 13, 2015.
Chinese Office Action cited in CN201310337779.1 dated Sep. 17, 2015.
European Search Report cited in EP14834055.7 dated Mar. 9, 2017.
International Search Report cited in PCT Application No. PCT/CN2014/082712 dated Oct. 22, 2014.
Written Opinion cited in PCT Application No. PCT/CN2014/082712 dated Oct. 22, 2014.

* cited by examiner

Primary Examiner — Hannah J Pak
(74) Attorney, Agent, or Firm — Workman Nydegger

(57) ABSTRACT

The present invention relates to a continuous manufacturing process for a rubber masterbatch and a rubber masterbatch prepared therefrom. The manufacturing process comprises the following steps: step 1): a filler is added to a rubber solution, forming a rubber/filler/solvent mixture by stirring; and step 2): the solvent is removed and the mixture is dried, resulting in a rubber/filler masterbatch. The present invention also relates to a masterbatch prepared by the above-mentioned process and a rubber article prepared using the masterbatch. Compared to the wet mixing technologies in the prior art, the present invention has no specific requirements of rubber and filler, with a wider scope of usage. In addition, the filler has a high dispersion in rubber compounds, the production process thereof is continuous, highly efficient, low in energy consumption and labour, and thus low in cost.

10 Claims, No Drawings

CONTINUOUS MANUFACTURING PROCESS FOR RUBBER MASTERBATCH AND RUBBER MASTERBATCH PREPARED THEREFROM

FIELD OF INVENTION

The invention relates to the field of rubber, especially to a method for continuously producing a rubber masterbatch and the rubber masterbatch prepared by the method.

BACKGROUND OF THE INVENTION

In the system of rubber/filler/additive/solvent, a coagulation step of rubber/filler/additive from the solvent is always included. WO98/58985 described a process in which a large turbo dryer with blade is operated in a device at 400/1200 rpm, the coagulation and drying speed is slow, the time of process is long and energy consumption is high. This invention omits the steps of coagulation, which simplifies the procedure and lowers the cost.

BRIEF SUMMARY OF THE INVENTION

In view of the existing technical problems, the purpose of the invention is to provide a method for continuously producing a rubber masterbatch and the rubber masterbatch prepared by the method. Another purpose of the invention is to provide a rubber article prepared by using the rubber masterbatch of this invention.

The advantages of the method for producing a rubber masterbatch continuously are listed as follows:

1) Continuous and high-efficient;
2) Omitting the step of coagulation, which simplifies the procedure and lowers the cost;
3) Compared with existing wet rubber mixing technology, the invention has no special requirements for the rubber and the filler, and has wide range of applications for the types and amounts of rubber, fillers, and additives;
4) Fillers have a high dispersity in the rubber material, and the continuous and efficient manufacturing technology requiring low power consumption and less labor.

The present invention further relates to the following examples.

A method for continuously producing a rubber masterbatch comprises:

Step 1): Adding a filler to a rubber solution to form a rubber/filler/solvent mixture under stirring;

Step 2): Removing the solvent and drying the rest of mixture to obtain rubber/filler masterbatch.

Wherein said drying in step 2) is that the mixture obtained in step 1) is transferred to a heating conveyor belt dryer, and heated and dried under vacuum or an inert gas, the volatilized solvent and the unreacted monomer in the synthesis of rubber enter into a condenser and a fractionation column for recovery; alternatively, said drying in step 2) is that the mixture obtained in step 1) is spray dried or flashed, the heating medium used is an inert gas or water vapor, and the volatilized solvent and the unreacted monomer in the synthesis of rubber enter into the condenser and the fractionation column for recovering.

Preferably, wherein, one or more additives selected from oil, an anti-aging agent, a coupling agent, an active agent, an antioxidant, a flame retardant, a heat stabilizer, a light stabilizer, a dye, a pigment, a vulcanizing agent and an accelerant are optionally added in step 1).

Preferably, wherein, in step 1, the filler is added into rubber solution, stir and form the rubber/filler/solvent mixture. And the rubber/filler/solvent mixture is further finely dispersed and refinedly dispersed so as to improve the dispersity of filler in rubber solution.

Preferably, wherein, the dried solid mixture contains water when water vapor is used as heating medium in step 2). By vacuum drying, heat drying or extrusion heat drying and water removal, rubber/filler masterbatch can be obtained.

More preferably, wherein, said heat drying is oven drying or air drying.

More preferably, wherein, said extrusion heat drying is extrusion first so as to remove the heating medium and then a further drying.

More preferably, wherein, said further drying is air drying, oven drying or mechanical drying.

More preferably, wherein said mechanical drying implements the drying by utilizing open mill, kneading machine, internal mixer machine, continuous mixer, single screw extruder, twin-screw extruder.

The invention further provides rubber masterbatch prepared by said method.

Furthermore, the invention also provides a rubber article prepared by using the masterbatch.

The method for producing a rubber masterbatch continuously comprises the following steps:

Step 1): Adding a filler to a rubber solution to form a rubber/filler/solvent mixture under stirring;

Step 2): Removing the solvent and drying the mixtures so as to obtain rubber/filler masterbatch.

Wherein drying in Step 2) is that the mixture obtained in Step 1) is transferred to a conveyor belt dryer with heating, and heated and dried under vacuum or inert gas, the solvent evaporated and unreacted monomers in the synthesis of rubber are transferred into the condenser and the fractionating column for recovering; alternatively, drying in Step 2) is that the mixture obtained in Step 1) is spray dried or flashed, in which the heating medium used is inert gas or water vapor, the solvent evaporated and unreacted monomers in the synthesis of rubber are transferred into the condenser and the fractionating column for recovering.

The method for continuously producing a rubber masterbatch optionally further comprises a step of recovering the solvent removed in step 2) for recycling. In addition, one or more additives selected from oil, anti-aging agent, coupling agent, active agent, antioxidant, flame retardant, heat stabilizer, light stabilizer, dye, pigment, vulcanizing agent and accelerant are optionally added in step 1).

Step 1) may be implemented by using the methods known in the art. Said stirring as described in Step 1) may be implemented by general stirrer, including but is not limited to, paddle stirrer, tank type stirrer, planetary stirrer, crank stirrer, and the like.

Step 1) may further comprise a fine dispersion step, in which said fine dispersion may be implemented by the following way: the mixture obtained after stirring is injected by a nozzle at high pressure under the condition of high shear, to improve the dispersion of filler and/or additive; the ejected material is rendered to pass through a multi-elbow pipe to make mixed solution collided with the wall of the tube in the tube, resulting in the increased dispersion of the filler and/or the additive; alternatively, the ejected material is rendered to pass through a pipe having varying inner diameters so as to change shear stress, resulting in the increased dispersion of the filler and/or the additive. The used pressure ranges from 0.1 MPa to 60 MPa, preferably 10 MPa to 40 MPa.

The mixture formed after said fine dispersion may be subjected by the following refined dispersion to further improve the dispersion of filler and/or additive in rubber solution:

i. The fine-dispersed mixture is added continuously into a ball mill and/or a colloid mill for dispersion, so that the filler and/or the additive are dispersed evenly in the rubber solution;

ii. The fine-dispersed mixture is added continuously into a grinder for grinding, so that the filler and/or the additive are dispersed fully in the rubber solution, in which the grinder has one or more sets of high speed rotating planar mill and a fixed pin or plate fixed on the mill sleeve and interleaved with the planar mill.

iii. The fine-dispersed mixture is added into a grinder for grinding continuously, in which the grinder has two blades rotating in the opposite directions, and the blades have a small orifice launder, dispersion degree of the filler and/or the additive in rubber solution can be improved by rotating blade under high pressure. The used pressure ranges from 0.1 MPa to 60 MPa, preferably 10 MPa to 40 MPa.

iv. The fine-dispersed mixture is continuously added into a multi-layer high pressure slit dispersion machine, so as to extrude the mixture from the slit between the two layers at high pressure, the strong shear force produced can improve the dispersion degree of the filler and/or the additive in the rubber solution. The used pressure ranges from 0.1 MPa to 60 MPa, preferably 10 MPa to 40 MPa.

v. The fine-dispersed mixture is continuously added to a power disperser device for dispersion, of which a high-speed rotating rotor has a lot of radially distributed slits or holes, the mixture collides with the surface of a stator at high speed to make the filler and/or the additive uniformly dispersed in the rubber solution.

Two or more than two of the above five fine dispersion methods can be used in series.

The rubber solution as described above may be directly obtained from the production line for preparation of solution-polymerized rubber, or can be prepared by dissolving any type of dry rubber in the solution of the dry rubber. When preparing rubber solution with dry rubber, the dry rubber may be any kind of rubber used in the art, such as natural polymer or synthetic polymer. Said natural polymer includes but is not limited to, natural rubber, gutta-percha, guayule, and the like; said synthetic polymer includes but is not limited to, monomer polymerized in solution (i.e., solution-polymerized rubber), monomer polymerized in emulsion, and the monomer polymerized by itself When the rubber solution as described above is directly obtained from the production line for preparation of solution-polymerized rubber, the solution-polymerized rubber is a homopolymer or copolymer of ethylene, propylene, butene, pentene, hexene, heptene, diene having 4-7 carbon atoms or triene having 6-7 carbon atoms, or alkene monomer having other atoms or functional groups, in which said other atoms or functional groups are silicon atom, fluorine atom, chlorine atom, nitrogen atom, oxygen atom, sulfur atom, ester group, amino ester group, or cyan, and also include a homopolymer and copolymer having the monomers, including but not limited to, polybutadiene, polyisoprene, styrene butadiene rubber, ethylene-propylene rubber, butyl rubber, butadiene-acrylonitrile rubber, neoprene, silicone rubber, fluorine rubber, polyurethane rubber, chlorosulfonated polyethylene rubber, acrylate rubber, and the like. Rubber molecular weight is 1000 to 40 million, preferably 5000 to 30 million, and more preferably 10000 to 8 million.

The solvents in rubber solution are good solvents for all kinds of rubbers. Specifically, solvent may be aliphatic hydrocarbon solvent, aromatic hydrocarbon solvent, chlorinated hydrocarbon solvent, ketone solvent, ether solvent and ester solvent, the aliphatic hydrocarbon solvent includes but is not limited to all kinds of solvent gasoline, cycloalkane, substituted cycloalkane, normal alkane, the aromatic hydrocarbon solvent includes but is not limited to, benzene, toluene, xylene, and styrene, the chlorinated hydrocarbon solvent includes but is not limited to, methylene chloride, chloroform, carbon tetrachloride, ethylene dichloride, chlorobenzene, tetrachloroethylene, and chlorine toluene. The concentration of rubber in solution ranges from 1% to 60% by weight, preferably 5% to 40% by weight, and more preferably from 10% to 30% by weight.

Said filler includes but is not limited to, all kinds of solid powdered reinforcing agent and fillers used in rubber, such as various types of carbon black, silica, metal oxides, salts, different resins and nanoscale materials of the fillers. Wherein the metal oxide includes but is not limited to, aluminum oxide, magnesium oxide, zinc oxide, and the like, the salt includes but is not limited to, calcium carbonate, clay, and nanoscale materials of the fillers. The specific surface area of the filler is 0.1 to 800 m$^2$/g, preferably 1 to 500 m$^2$/g, and more preferably 5 to 300 m$^2$/g. For carbon black, and silica (white carbon black), the oil absorption value thereof is 20 to 250 ml/100 g, preferably 25 to 200 ml/100 g, and more preferably 30 to 150 ml/100 g, wherein the filler includes the mixture thereof, such as multiphase filler, including but not limited to, dual phase or multiphase filler composed of carbon black, silica, alumina, magnesium oxide, zinc oxide, calcium oxide, titanium oxide, and boron oxide. For two phase or multiphase filler, the oil absorption value is 20 to 250 ml/100 g, preferably 25 to 200 ml/100 g, and more preferably 30 to 150 ml/100 g. The amount of filler used is between 5 and 300 parts by weight (based on 100 parts by weight of rubber), preferably 10 to 200 parts by weight, and more preferably 30 to 150 parts by weight. Said filler also includes a combination of two or more of the fillers.

Said filler also includes surface modified filler thereof. Wherein, the surface modification may be made by reactions to connect certain functional groups on the filler surface or by mixing or adsorption and combines modifier by physical way on the filler surface. For the modification, the modifier can be dissolved in solvent and mixed with the filler for liquid modification, such as described in Wang W, Nanse G, Vidal, A, et al., k. g. k. [J], 1994, 47:493, and also can be mixed with filler and heated for solid phase modification, such as described in Wang M J, Wolff. S. R. C. T [J], 1992, 65:715. Surface modification can also be performed before adding filler in rubber solution, or adding modifier to the mixture of rubber solution and filler for surface modification. The modifier as described above is conventional modifier in the art, such as organic silane coupling agent expressed in the following general formula:

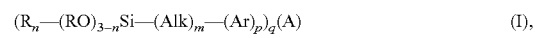  (I),

  (II), or

  (III), in the formula, when q=1, A is —SCN, —SH, —Cl, or —NH$_2$;

when q=2, A is —S$_X$—.

R and R' refers to branched or linear alkyl or phenolic group with 1 to 4 carbon atoms. R and R' can be the same or different.

n is 0, 1 or 2;

Alk is linear or branched alkyl containing 1 to 6 carbon atoms;

$Alk_{enyl}$ is linear or branched chain Alkenyl containing 1 to 6 carbon atoms;

m is 0 or 1;

Ar is aryl containing 6 to 12 carbon atoms;

p is 0 or 1, p and n cannot be 0 at the same time;

x is 2 to 8;

wherein the most commonly used modifier is bis (triethoxy propyl silane) tetrasulfide and disulfide, 3-sulfur cyano propyl-triethoxy silane, gamma-mercapto-trimethoxysilane, zirconium acid ester coupling agent, phthalate coupling agent, nitro coupling agent, and alcohol compound. The alcohol compound includes but is not limited to, monohydric alcohol, glycol, and polyol. The alcohol compound includes but is not limited to, propyl alcohol, butyl alcohol, ethylene glycol, polyethylene glycol and its derivatives.

In Step 1) of the invention, the filler and/or the additive may be directly added to the rubber solution, and can also be added firstly to solvent which is the same with that in the rubber solution or different, and mixed so as to form the uniform suspending liquid, and then added to rubber solution under stirring. The additive can optionally include one or more additives selected from oil, anti-aging agent, coupling agent, active agent, antioxidant, flame retardant, heat stabilizer, light stabilizer, dye, pigment, vulcanizing agent and accelerant. The amount of additives used is a conventional dosage, or is adjusted according to the requirement of the actual situation.

The drying in step 2) is that the mixture obtained in step 1) is transferred into a heating conveyer belt dryer, and heated and dried in vacuum or inner gas (for example nitrogen gas), the solvent evaporated and unreacted monomers in the synthesis of rubber are transferred into the condenser and the fractionating column for recovering; alternatively, said drying in step 2) is that the mixture obtained in step 1) is spray dried or flashed, the heating medium used is an inert gas (for example nitrogen gas) or water vapor, and the volatilized solvent and the unreacted monomer in the synthesis of rubber enter into the condenser and the fractionation column for recovering. The dried solid mixture contains water when water vapor is used as heating medium, and by vacuum drying, heat drying or extrusion drying and water removal, rubber/filler masterbatch is obtained. The drying includes room temperature vacuum drying, frozen vacuum drying and heating vacuum drying. The heat drying may be a common drying method, such as oven drying or air drying. The extrusion heat drying is removal of heating medium by extrusion first and a further drying, wherein the further drying is air drying, oven drying or mechanical drying, said mechanical drying is drying by using an open mill, kneading machine, internal mixer, continuous internal mixer, single-screw extruder, and twin-screw extruder.

The method for recovering solvents can be any known methods in the art, such as the evaporated solvent is recovered by the method of surface condensation or direct contact condensation. When using direct contact condensation method, water can be used as the coolant.

DESCRIPTION OF THE PREFERRED EMBODIMENTS

The present invention is further described by the examples blow, but the scope of the present invention is not limited to these examples.

1. The examples is determined by the following equipments and measuring methods:

TABLE 1

Equipments for preparation of rubber samples

| No. | Name of Equipment | Specification/Model | Manufacturer |
|---|---|---|---|
| 1 | Internal mixer machine | XSM-1/10-120 | Shanghai Kechuang Rubber Plastics Machinery Co., Ltd. |
| 2 | Open Mill | 152.5*320 | Guangdong Zhanjiang machinery Factory |
| 3 | Press Vulcanizer | XLB-D600*600 | Zhejiang Huzhou Dongfang Machinery Co., Ltd. |

TABLE 2

Methods and instruments for testing the physical properties of vulcanized rubber

| No. | Test Item | Test Standards | Name of Instruments | Specification/Model | Manufacturer |
|---|---|---|---|---|---|
| 1 | Filler dispersion in rubber material | — | Carbon Black Dispersion Instrument | GT-505-CBD | High Iron Testing Instrument Co., Ltd. |
| 2 | Hardness | GB/T 531.1-2008 | Sclerometer (Shao A) | LX-A | Shanghai LiuLing Instrument Plant |
| 3 | Tensile Strength (Mpa) | GB/T 528-2009 | Servo Control Tensile Testing Machine | A1-3000 | High Iron Testing Instrument Co., Ltd. |
| 4 | Elongation at Break (%) | GB/T 528-2009 | Servo Control Tensile Testing Machine | A1-3000 | High Iron Testing Instrument Co., Ltd. |
| 5 | Rebound Resilience (%) | GB/T 1681-2009 | Resilience Tester | GT-7042-RE | High Iron Testing Instrument Co., Ltd. |
| 6 | Heat Build-up | GB/T 1687-1993 | Heat Build-up Tester | RH-2000N | High Iron Testing Instrument Co., Ltd. |
| 7 | Abrasion Tester | GB/T 1689-1998 | DIN Abrasion Tester | GT7012-A | High Iron Testing Instrument Co., Ltd. |

2. Examples and Comparative Examples

Raw material.

Synthesis polyisoprene rubber, IR-70, Qingdao Yikesi Advanced Material Co., Ltd.

Solution polymerized styrene-butadiene rubber (SSBR), VSL4526-OHM, manufacturer: LANXESS.

Butadiene rubber, BR9000, Sinopec Qilu Co., Ltd.

White carbon black, NEWSIL165-MP, Quecheng Silicon Chemistry Co., Ltd.

Zinc oxide, Dalian Zinc Oxide Factory.

Stearic acid, PF1808, Malaysia Licheng Co., Ltd.

Anti-aging agent 4020, Jiangsu Shengao Chemistry Co., Ltd.

Anti-aging agent 264, Zhejiang Huangyan Zhedong Rubber Chemicals Co., Ltd.

Anti-aging agent RD, Sinopec Nanjing Chemical Industry Co., Ltd. Chemical Plant.

Silane coupling agent Si69, Nanjing Shuguang Chemical Engineering Co., Ltd.

Accelerating agent CZ, Shandong ShangShu Chemistry Co., Ltd.

Accelerating agent D, Shandong Shanxian Chemistry Co., Ltd.

Sulfur, Wudi Jinsheng Chemistry Co., Ltd.

Anti-scorching agent (CTP), Shandong Yanggu Huatai Chemical Engineering Co., Ltd.

The parts in the following examples and comparative examples are parts by weight.

EXAMPLE 1

60 parts of white carbon black and 6 parts of silane coupling agent Si69 were added into 100 parts of 8% maleinoid polyisoprene solution in normal hexane. Wherein, the rubber/white carbon black/Si69/normal hexane mixture was mixed using blade mixer, and then, was injected into dryer which contains approximately 150° C. nitrogen gas to form rubber particles without solvent. The mixture of nitrogen gas which contained rubber particles in the form of powder and solvent went through cyclone separator so as to separate rubber particles so as to provide masterbatch 1 in the form of powder.

The masterbatch 1 was added on open mill and coated evenly. 3.5 parts of zinc oxide, 1 part stearic acid, 1.5 parts of anti-aging agent RD, 2 parts of anti-aging agent 4020 and 1.6 parts of anti-scorching agent were added, and further, 2 parts of accelerant CZ, 1 part accelerant D, 1.6 parts of sulfur were added. Then, the materials passed the roller for batch-off. They were kept for 8 hours, and then added to 150° C. plate vulcanizing machine. They were vulcanized until positive vulcanization to provide wet vulcanized rubber 1.

COMPARATIVE EXAMPLE 1

60 parts of white carbon black and 6 parts of silane coupling agent Si69 were added to 100 parts of synthesized cis polyisoprene in an internal mixer for mixing, when a filler was mixed with rubber, 3.5 parts of zinc oxide, 1 parts of stearic acid, and 1.5 parts of anti-aging agent RD and 2 parts of 4020 were added and mixed. They were kept for 8 hours, and then, 2 parts of accelerating agent CZ, 1 part of accelerating agent DPG and 1.6 parts of sulfur were added to the premixed rubber in the open mill to prepare a mixed rubber. By batch out of the open mill, after being kept for 8 hours, the mixed rubber was vulcanized in a flat vulcanizing machine under 150° C. until positive sulfuration, so as to provide dry vulcanized rubber 1.

EXAMPLE 2

56 parts of white carbon black, 5.6 parts of silane coupling agent Si69, and 3.5 parts of zinc oxide were added to of 100 parts of 12% cis polyisoprene solution in N-hexane, the mixture of rubber, white carbon black, Si69, and N-hexane is mixed by a blade paddle stirrer, injected in a multi-elbow tube by a nozzle to make the mixed solution collided with wall of the tube in the tube, resulting in an increased dispersion of filler. Then the mixture was added to a grinder continuously for a refined dispersion. The mixture was dried in a vacuum dryer having a vacuum degree of −0.08 MPa for 20 min, so as to collect masterbatch 2.

2 parts of stearic acid and 2 parts of anti-aging agent 4020 were added to the above obtained masterbatches 2 in the internal mixer, and they were mixed for 2 min, discharged from the internal mixer, then rolled and batched out by an open mill. After mixed and kept for 8 hours, 2 parts of accelerating agent CZ, 1 part of accelerating agent D and 1.6 parts of sulfur were added in the internal mixer, mixed for 1.5 min, and discharged from the internal mixer. The obtained rubber material was batched out by the open mill, kept for 8 hours, vulcanized in a flat vulcanizing machine under 150° C. until positive sulfuration, so as to provide wet vulcanized rubber 2.

COMPARATIVE EXAMPLE 2

56 parts of white carbon black and 5.6 parts of silane coupling agent Si69 were added to 100 parts of synthesized cis polyisoprene in an internal mixer for mixing. When the filler was mixed with rubber, 3.5 parts of zinc oxide, 2 parts of stearic acid, and 2 parts of anti-aging agent 4020 were added, mixed for 4 minutes then discharged from the internal mixer, then rolled and batched out by an open mill to obtain a premixed rubber. After they were kept for 8 hours, 2 parts of accelerating agent CZ, 1 part of accelerating agent DPG and 1.8 parts of sulfur were added to the premixed rubber in the open mill to prepare a mixed rubber. By batch out of the open mill, after being kept for 8 hours, the mixed rubber was vulcanized in a flat vulcanizing machine under 150° C. until positive sulfuration, to provide dry vulcanized rubber 1.

TABLE 3

Physical properties of wet/dry vulcanized rubbers

| | Wet vulcanized Rubber 1 | Dry vulcanized Rubber 1 | Wet vulcanized Rubber 2 | Dry vulcanized Rubber 3 |
|---|---|---|---|---|
| Dispersion degree of white carbon black | 5.5 | 4.3 | 6.2 | 4.0 |
| Hardness, RT, Shao A. | 66.8 | 73.5 | 67.8 | 70.0 |
| Tensile Strength (Mpa) | 27.8 | 27.5 | 28.8 | 28.0 |
| Elongation at Break (%) | 520 | 629 | 462 | 480 |
| Rebound Resilience, (23° C., %) | 48.3 | 46.5 | 54.4 | 53.1 |
| Rebound Resilience, 60° C., % | 61.8 | 58.5 | 64.8 | 63.4 |
| Bottom Temperature Rise, ° C. | 21.5 | 22.5 | 20.1 | 21.7 |
| DIN Abrasion Index | 102 | 100 | 108 | 100 |

Table 3 shows that under different prescriptions and procedures, the physical properties of vulcanized rubbers obtained from wet masterbatch exploit examples and dry masterbatch comparison examples. It shows that, using the same prescriptions, compared to the dry masterbatch, the wet masterbatch exhibits that the degree of filler dispersion in the rubber is largely improved, the hardness of vulcanized rubber is lower, tensile strength and elongation at Break are higher, resilience is higher, dynamic compression heat production is lower, and abrasive resistance is better as well.

The invention claimed is:

1. A method for continuously producing a rubber masterbatch, comprising the following consecutive steps:
   step (1): adding a filler in a rubber solution, and stirring to form a rubber/filler/solvent mixture;
   step (2): removing the solvent, and drying said mixture to obtain a rubber/filler masterbatch;
   wherein, said drying in step 2) is that the mixture obtained in step 1) is transferred to a heating conveyor belt dryer, and heated and dried under vacuum or an inert gas, the volatilized solvent and the unreacted monomer in the synthesis of rubber enter into a condenser and a fractionation column for recovery;
   alternatively, said drying in step 2) is that the mixture obtained in step 1) is spray dried or flashed, and a heating medium used is an inert gas or water vapor, and the volatilized solvent and the unreacted monomer in the synthesis of rubber enter into the condenser and the fractionation column for recovering.

2. The method according to claim 1, wherein one or more additives selected from the group consisting of oil, an antioxidant, an anti-aging agent, a coupling agent, an active agent, a flame retardant, a heat stabilizer, a light stabilizer, a dye, a pigment, a vulcanizing agent, and an accelerating agent, are added in the step (1).

3. The method according to claim 1, wherein the step (1) comprises adding the filler into the rubber solution, stirring to form the rubber/filler/solvent mixture, as well as further finely and refinedly dispersing the rubber/filler/solvent mixture to improve the dispersity of the filler in the rubber solution.

4. The method according to claim 1, wherein the heating medium as described in the step (2) is water vapor, and the dried solid mixture contains water, and by vacuum drying, heat drying or extrusion heat drying, water is removed so as to obtain a rubber/filler masterbatch.

5. The method according to claim 4, wherein the heat drying is oven drying or air drying.

6. The method according to claim 4, wherein the extrusion heat drying comprises first extrusion to remove the heating medium, and then a further drying.

7. The method according to claim 6, wherein the further drying is air drying, oven drying or mechanical drying.

8. The method according to claim 7, wherein the mechanical drying is a drying by open mill, kneading machine, internal mixer, continuous internal mixer, single-screw extruder, or twin-screw extruder.

9. A rubber masterbatch prepared by the method according to claim 1.

10. A rubber article comprising the rubber masterbatch according to claim 9.

* * * * *